United States Patent [19]

Tröster

[11] Patent Number: 5,207,485
[45] Date of Patent: May 4, 1993

[54] ROAD VEHICLE DRIVE-SLIP CONTROL DEVICE AND ANTI-LOCK SYSTEM

[75] Inventor: Harry Tröster, Tamm, Fed. Rep. of Germany

[73] Assignee: Mercedes-Benz AG, Fed. Rep. of Germany

[21] Appl. No.: 674,114

[22] Filed: Mar. 25, 1991

[30] Foreign Application Priority Data

Mar. 26, 1990 [DE] Fed. Rep. of Germany ....... 4009640

[51] Int. Cl.⁵ .............................................. B60T 8/48
[52] U.S. Cl. ............................ 303/113.2; 303/116.1; 303/116.2
[58] Field of Search ................... 303/10, 11, 113 TR, 303/116 R, 116 SP, 100, 103, DIG. 3, DIG. 4; 188/181 R, 181 A

[56] References Cited

U.S. PATENT DOCUMENTS

| 4,861,116 | 8/1989 | Bernhardt et al. | 303/113 TR |
| 4,898,430 | 2/1989 | Becker-Endrig Keit et al. | 303/113 TR |
| 4,971,400 | 11/1990 | Jonner | 303/113 TR |
| 5,039,176 | 8/1991 | Hellmann et al. | 303/116 R |

FOREIGN PATENT DOCUMENTS 3802133 8/1989 Fed. Rep. of Germany .
2111149 9/1982 United Kingdom .
2214254 8/1989 United Kingdom .

Primary Examiner—Matthew C. Graham
Assistant Examiner—Lee W. Young
Attorney, Agent, or Firm—Evenson, McKeown, Edwards & Lenahan

[57] ABSTRACT

In a drive-slip control device (ASR) and anti-lock system (ABS) in a road vehicle with a hydraulic multi-circuit brake system, the return-flow pump assigned to the brake circuit of the driven vehicle wheels is used as an auxiliary pressure source for the ASR. The discharge of a pressure accumulator connected to the return line of the brake circuit of the driven vehicle wheels, after the conclusion of a drive-slip control phase, is achieved when the return-flow pump continues to be maintained in the conveying mode for a delay time commencing with the disappearance of the situation requiring control. The ASR control valve provided for shutting off the brake unit from the main brake line of the brake circuit of the driven vehicle wheels is maintained in its closing position assigned to the ASR mode. A pressure relief valve is connected in parallel with the ASR control valve. For the variable presetting of the delay time, a buffer accumulator is equipped with a pressure monitor. The output signal characteristic of the relieved buffer accumulator is used for limiting the delay time.

21 Claims, 3 Drawing Sheets

ROAD VEHICLE DRIVE-SLIP CONTROL DEVICE AND ANTI-LOCK SYSTEM

BACKGROUND AND SUMMARY OF THE INVENTION

The present invention relates to a drive-slip control device (ASR) and an anti-lock system (ABS) for a road vehicle with a hydraulic multi-circuit brake system, in which the risk of failure of the brake circuit of the driven wheels is considerably reduced.

DE 3,802,133 A1 shows a known ASR in combination with an ABS. There, the ASR works on the principle of decelerating again a driven vehicle wheel tending to spin by activating its wheel brake, and the ABS works on the return-flow principle at least on the brake circuit assigned to the driven vehicle wheels. The return-flow pump of the ABS assigned to the brake circuit of the driven vehicle wheels is used for the ASR as an auxiliary-pressure source, the outlet pressure of which is fed, in brake-pressure build-up phases of the drive-slip control, into the wheel brake or wheel brakes subjected to the control.

Brake-pressure regulating valves of the ABS are used for a similar purpose within the ASR. As long as the ASR is activated, the outlet-pressure space assigned to the brake circuit of the driven vehicle wheels and belonging to the brake unit conventionally designed as a tandem master cylinder is shut off by an ASR control valve from the main brake line of the brake circuit of the driven vehicle wheels. The basic position of this ASR control valve is its throughflow position assigned to the normal braking mode and to the braking mode assigned to an anti-lock control. A pressure relief valve is connected in parallel with this ASR control valve, via which, in the drive-slip control mode, overpressure generated in the main brake line of the brake circuit of the driven vehicle wheels can be relieved towards the brake unit and via this to the pressureless reservoir of the brake system.

A buffer accumulator is connected to the return line of the brake circuit of the driven vehicle wheels and is designed as a low-pressure accumulator. In brake-pressure reduction phases of the anti-lock control and of the drive-slip control, the buffer accumulator quickly receives brake fluid bled from one or both wheel brakes of the brake circuit of the driven vehicle wheels, before this fluid is successively pumped back by the return-flow pump of this brake circuit into the outlet-pressure space assigned thereto of the brake unit or the brake-fluid reservoir of the brake system in a plurality of feed strokes of the return-flow pump.

The buffer accumulator can be charged to a pressure of approximately 15 bars at the end of a pressure reduction phase of the drive-slip control. If braking occurs at such a moment when the buffer accumulator is being charged, with the result that the drive-slip control mode is interrupted, and if this braking takes place in a driving situation in which, even with only a low brake pressure, an anti-lock control on the driving axle of the vehicle also becomes necessary, for example because the vehicle is traveling on a road made smooth from ice or snow then, since the buffer accumulator is full, during the introductory brake-pressure reduction phase of the anti-lock control, brake pressure either cannot be reduced at all or at best be reduced much too slowly.

To prevent a danger that the rear wheels of the vehicle will lock as a result of this inability to reduce the brake pressure, the known control device has a 2/2-way solenoid valve inserted between the buffer accumulator and the brake-fluid reservoir of the brake system. In brake-pressure reduction phases of the drive-slip control, the solenoid valve is moved into its throughflow position so that brake fluid can be bled from the buffer accumulator directly towards the brake-fluid reservoir. In the event of a malfunction of this accumulator bleeding valve, namely leakage or catching in the throughflow position, therefore, there is a possibility that the brake circuit of the driven vehicle wheels may be emptied when the anti-lock control responds to it and therefore fails. This possibility constitutes a considerable safety risk.

An object of the present invention is, therefore, to improve an ASR combined with an ABS, such that, even with a nevertheless low total production outlay therefor, the risk of failure of the brake circuit of the driven vehicle wheels is considerably reduced.

According to the present invention, this object has been achieved by providing a system in which, after termination of a situation requiring the drive-slip control and in the event of an interruption of a drive-slip control cycle as a result of the actuation of the brake system, an electronic control unit generates control signals by way of which for a delay time the return-flow pump continues to operate and the drive-slip control valve is maintained in a closed position assigned to the drive-slip control mode, the duration of this delay time being sufficient to ensure that a quantity of brake fluid corresponding to a quantity previously received by the buffer accumulator of the brake circuit of the driven vehicle wheels is conveyed out of the brake circuit back into the outlet-pressure space of the brake unit assigned thereto.

Because the return-flow pump is cut out with a delay in relation to the termination of a situation requiring the drive-slip control and the ASR control valve is reset to its basic position assigned to the braking mode, the buffer accumulator can be emptied sufficiently quickly by the return-flow pump driven for a delay time even with the brake circuit of the driven vehicle wheels permanently closed. The risk of a failure of the brake circuit by the actuation of the anti-lock control on the brake circuit of the driven vehicle wheels is thus avoided.

Furthermore, a simpler overall design is generally achieved since an accumulator bleeding valve is not required. If a drive-slip control cycle is interrupted as a result of the actuation of the brake system, then as long as the ASR control valve is still closed the return-flow pump works from the buffer accumulator into the wheel brakes, so to that extent, although these are shut off from the main brake cylinder, brake pressure can be built up.

When the delay time is determined by a timer of the electronic control unit, in the simplest instance this time will have a fixed value, e.g. 400 ms is suitable.

Other features of the present invention give advantageously simple alternatives for obtaining a variable duration of the delay time appropriate to particular requirements.

By way of a solenoid valve which can be produced in a simple manner, a more exact proportioning of the inflow of brake fluid to the return-flow pump during drive-slip control is possible. The need to bleed brake fluid to the brake unit via the pressure relief valve too frequently can thereby be avoided, thus protecting both the pressure relief valve and the brake unit. Furthermore, there is no possibility that, in the event of a malfunction of the precharging pump to the effect that this does not cut off, additional brake fluid will be pumped into the brake circuit during the anti-lock control, which could result in damage to the brake unit.

If an overall pressure accumulator chargeable by the precharging pump is provided, then it is possible to use a precharging pump of favorably small construction which, together with the accumulator likewise of small construction, can be integrated into the hydraulic unit of the ASR and ABS, and at the same time the charging mode of the precharging pump can be controlled in a simple way.

If the return-flow pump of the brake circuit of the driven vehicle wheels is configured as a self-priming pump which therefore does not need a precharging pump, a considerable overall simplification of control device construction is achieved.

In turn, a precise proportioning of the outlet pressure of the return-flow pump is possible by an inflow control valve. This valve can be switched jointly with the ASR control valve.

A buffer chamber inserted into the hydraulic periphery of the return-flow pump affords additional safety to the effect that a sufficient quantity of well deaerated brake fluid is available in the drive-slip control mode. In combination therewith, it is especially advantageous to insert the pressure relief valve into the hydraulic unit of the ASR, likewise in order as far as possible to prevent air from being admixed with the brake fluid.

A solenoid valve inserted between the outlet of the return-flow pump and its feed line is actuatable to prevent in a simple manner the possibility that the self-priming return-flow pump will suck brake fluid from the reservoir during an anti-lock control operation.

BRIEF DESCRIPTION OF THE DRAWINGS

These and other objects, features and advantages of the present invention will become more apparent from the following detailed description of presently preferred embodiments when taken in conjunction with the accompanying drawings wherein.

DETAILED DESCRIPTION OF THE DRAWINGS

Figure 1:
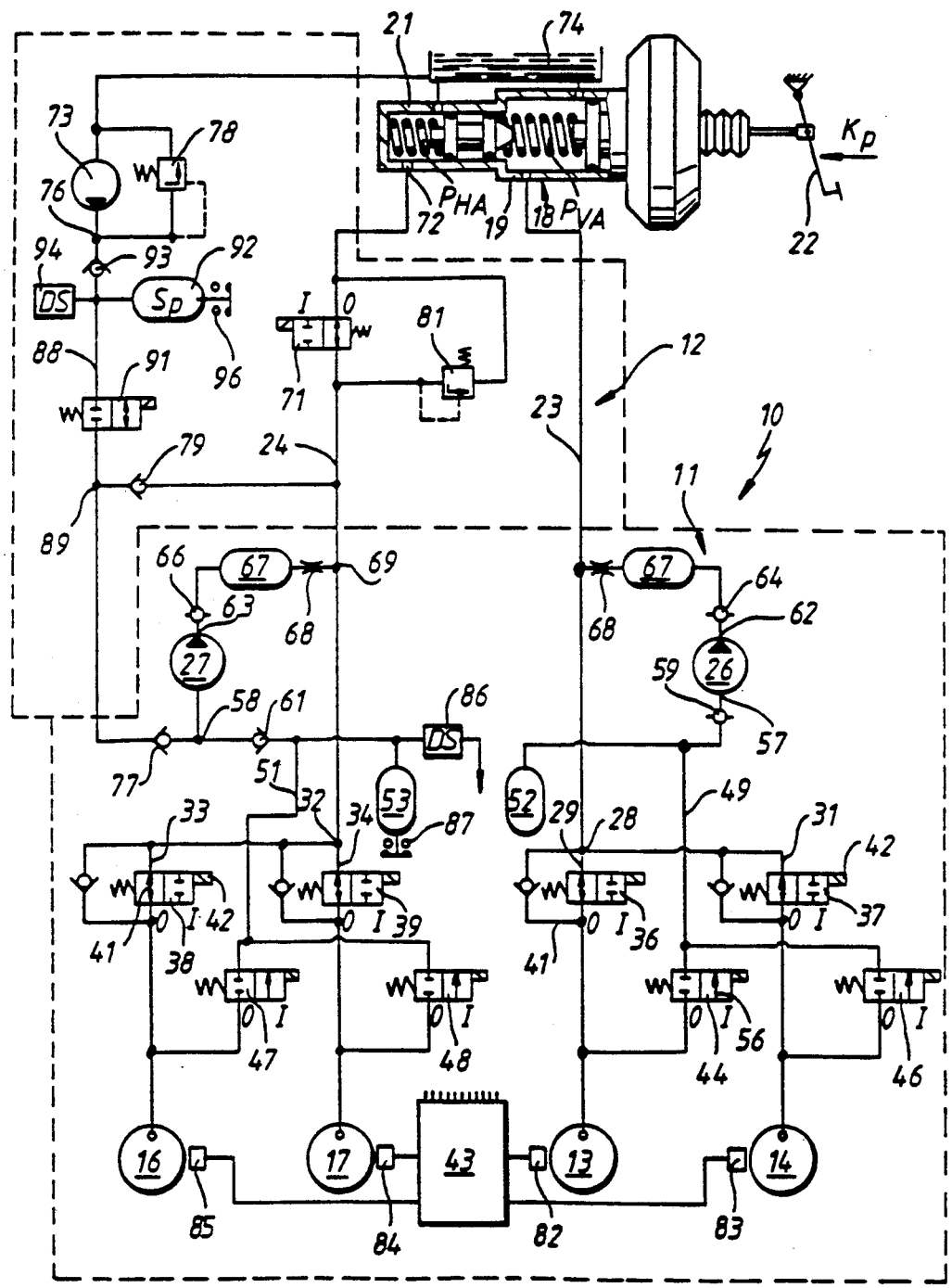
FIG. 1 is a schematic hydraulic diagram of a road vehicle brake system equipped with a combination of ASR and ABS according to the present invention in which the return-flow pump of the brake circuit of the driven vehicle wheels is used as a pressure source for the drive-slip control.

In FIG. 1 a hydraulic dual-circuit brake system is designated generally by numeral 10 for a road vehicle which is equipped with an anti-lock system (ABS) 11 and a drive-slip control device (ASR) 12 also using functional elements of the ABS 11.

It is assumed that the vehicle has rear-wheel drive and that the wheel brakes 13 and 14 of the non-driven front wheels are combined to form a front-axle brake circuit I and the wheel brakes 16 and 17 of the driven rear wheels are combined to form a rear-axle brake circuit II.

For supplying brake pressure to the two brake circuits I and II which are configured as static brake circuits, there is provided a brake unit designated generally by the numeral 18 which is a tandem master cylinder having two outlet-pressure spaces 19 and 21 which are each assigned to one of the two brake circuits I and II. Under the control of the force Kp with which the driver actuates a brake pedal 22, it is possible to build up in the cylinder 18 static brake pressure $P_{VA}$ and $P_{HA}$ which can be fed via the respective main brake lines 23 and 24 of the front-axle brake circuit I and of the rear-axle brake circuit II into their wheel brakes 13, 14 and 16, 17. For this purpose, the front-axle brake circuit I is connected to the primary outlet-pressure space 19 and the rear-axle brake circuit II is connected to the secondary outlet-pressure space 21 of the tandem master cylinder 18.

The ABS 11 works both on the front-axle brake circuit I and on the rear-axle brake circuit II on the return-flow principle, whereby, in brake-pressure reduction phases of the anti-lock control, brake fluid bled from a wheel brake 13 and/or 14 or 16 and/or 17 subjected to the control is pumped back into the outlet-pressure space 19 or 21 of the master cylinder 18 assigned to the respective brake circuit I or II. To this end, each of the two brake circuits I and II has its own return-flow pump 26, 27 which, as a rule, is a free-piston pump having an electrically actuatable drive conventionally designed, in a way not specifically shown, as an eccentric drive which jointly drives the two return-flow pumps 26 and 27.

The two brake-line branches 29 and 31 starting from a branch point 28 of the main brake line 23 of the front-axle brake circuit I and the brake-line branches 33 and 34 starting from a branch point 32 of the main brake line 24 of the rear-axle brake circuit II, via which branches brake pressure is fed into the wheel brakes 13 and 14 of the front-axle brake circuit I and the wheel brakes 16 and 17 of the rear-axle brake circuit II respectively, are each guided via an inlet valve 36, 37, 38 and 39, respectively, which, when the ABS 11 or ASR 12 has not responded, assume their illustrated basic positions 0, namely their throughflow positions. In such positions, the wheel-brake cylinders of the front-wheel brakes 13 and 14 and of the rear-wheel brakes 16 and 17 are connected, via a respective throughflow path 41 of these inlet valves 36 to 39, to the main brake line 23 and 24 of the respective brake circuit I and II. In the basic positions 0 of these inlet valves 36 to 39 during "normal" braking, that is to say braking not subjected to an anti-lock control, it is possible for both brake pressure to be built up and for brake pressure to be reduced as a result of the actuation of the brake unit 18.

In the embodiment illustrated, the inlet valves 36 to 39 are 2/2-way solenoid valves which, when their switching magnets 42 are activated by output signals from an electronic control unit 43 provided both for the operational control of the ASR 12, can be moved individually or severally, depending on the particular vehicle wheel or vehicle wheels on which the control is to take effect, into their energized position I, namely their closing position. In the closing position, wheel brake or wheel brakes 13 and/or 14 or 16 and/or 17 of the front-axle brake circuit I or of the rear-axle brake circuit II, respectively, subjected to the control is or are shut off from the respective main brake line 23 or 24.

Moreover, the wheel-brake cylinders of the front-wheel brakes 13 and 14 and of the rear-wheel brakes 16 and 17 are connected via an outlet valve 44 and 46 and 47 and 48, respectively to a return line 49 of the front-axle brake circuit I and to a return line 51 of the rear-axle brake circuit II, to which there is also respectively connected a buffer accumulator 52 and 53 which is a low-pressure accumulator. The storage capacities of the accumulators 52, 53, in terms of volume, correspond approximately to half those brake-fluid volumes which have to be displaced respectively into the front-axle brake circuit I and the rear-axle brake circuit II to achieve maximum brake pressure $P_{VA}$ and $P_{HA}$.

The outlet valves 44, 46, 47 and 48 are likewise 2/2-way solenoid valves which, as a result of the energization of each of their control magnets 54 by an output control signal from the electronic control unit 43, can be moved individually or severally, depending on the particular vehicle wheel on which the ABS 11 responds, out of their basic position 0, namely their closing position, into their energized position I, namely their throughflow position. In the throughflow position, the wheel brake or wheel brakes 13 and/or 14 or 16 and/or 17 of the front-axle brake circuit I or of the rear-axle brake circuit II subjected respectively to the control in the direction of a brake-pressure reduction is or are connected via the throughflow path 56 of the respective outlet valve to the return line 49 of the front-axle brake circuit I or the return line 51 of the rear-axle brake circuit II.

The inlets 57 and 58 of the two return-flow pumps 26 and 27 are respectively connected via inlet non-return valves 59 and 61 to the return line 49 of the front-axle brake circuit I and to the return line 49 of the front-axle brake circuit I and to the return line 51 of the rear-axle brake circuit II. These inlet non-return valves 59 and 61 are loaded in the opening direction by a relatively higher pressure in the respective return line 49 and 51 and the buffer accumulator 52 and 53 connected respectively to these, and are maintained in their closing positions by relatively higher pressure at the respective pump inlet 47 and 48 than in the return line 49 and 51. The closing force of the valve springs of these inlet non-return valves 59 and 61 is equivalent to a pressure of 2 to 3 bars in a typical design of these.

The buffer accumulators 52 and 53 can be piston/-spring accumulators, and are typically configured so that the prestress of their accumulator springs is equivalent to a somewhat higher accumulator pressure of, for example, 4 to 6 bars and, when the holding capacity of the buffer accumulators 52 and 53 is fully used, is equivalent to a pressure of approximately 10–15 bars.

The pump outlets 62 and 63 of the two return-flow pumps 26 and 27 are connected via respective outlet non-return valves 64 and 66 to the main brake line 23 of the front-axle brake circuit I and to the main brake line 24 of the rear-axle brake circuit II. These outlet non-return valves 64 and 66 are loaded in the opening direction by a relatively higher pressure at the respective pump outlet 62 and 63 and in the closing direction by a relatively higher pressure in the respective main brake lines 23 and 24. For the purpose of noise attenuation, a buffer chamber 67 and a throttle 68 are connected in series between these outlet non-return valves 64 and 66 and the respective main brake lines 23 and 24. The outlet non-return valves 64 and 66 have a configuration which corresponds to that of the inlet non-return valves 59 and 61 of the two return-flow pumps 26 and 27.

The ABS 11 explained thus far conforms to series produced vehicles and to that extent is known in terms of both configuration and operation. Therefore, further explanations in this respect are not necessary.

The functional components of the ABS 11 explained in relation to the rear-axle brake circuit II, that is to say the brake circuit of the driven vehicle wheels, namely the brake-pressure regulating valves 38 and 39, and 47 and 48, the buffer accumulator 53 and the return-flow pump 27, are also used for a similar purpose within the ASR 12 which works on the known principle of decelerating again a vehicle wheel tending to spin as a result of the automatic actuation of its wheel brake 16 or 17.

The return-flow pump 27 of the rear-axle brake circuit II is used as the auxiliary pressure source on the ASR 12, of which the connection point 69 to the main brake line 24 of the rear-axle brake circuit II can be shut off by an ASR control valve 71 from the delivery outlet 72 of the outlet-pressure space 21 of the tandem master cylinder 18 assigned to the rear-axle brake circuit II. This ASR control valve 71 is a 2/2-way solenoid valve, the basic position 0 of which is its throughflow position which is assigned to the normal braking mode and to the braking mode subjected to an anti-lock control, and the energized position I of which is its closing position which is assigned to the drive-slip control mode.

Furthermore, within the ASR 12, an electrically driven precharging pump 73 is provided which, in the drive-slip control mode, conveys brake fluid from the reservoir 74 of the brake system 10 to the inlet 58 of the return-flow pump 27 of the rear-axle brake circuit II. A further non-return valve 77 is between the outlet 76 of the precharging pump 73 and the inlet 58 of the return-flow pump 27 and acts as an inlet non-return valve of the return-flow pump 27. The valve 77 is loaded in the opening direction by a relatively higher outlet pressure of the precharging pump than the inlet 58 of the return-flow pump, and is otherwise closed.

A pressure relief valve 78 is connected in parallel with the precharging pump 73 for limiting the outlet pressure of the precharging pump 73 to a value of around 20 bars.

The outlet 76 of the precharging pump 73 is connected directly, via a further non-return valve 79, to the main brake line 24 of the rear-axle brake circuit II. This non-return valve 79 is also loaded in the opening direction by a relatively higher outlet pressure of the precharging pump 73 than the pressure prevailing in the main brake line 24, and otherwise is closed. The closing forces of the valve springs of the two non-return valves 77 and 79 are equivalent to pressures of around 2 to 3 bars.

A pressure relieve valve 81 is connected in parallel with the ASR control valve 71 for limiting the pressure which can be fed into the main brake line 24 of the rear-axle brake circuit II by the return-flow pump 27 in the ASR mode to a value of around 200 bars.

To explain the functioning of the ASR 12 described thus far above, it will be assumed as a typical practical example that there is a starting situation in which, for example, the drive slip of the right rear wheel increases more sharply than that of the left rear wheel. In such a situation, as soon as a response threshold value of the drive slip of the rear wheel tending to spin of, for example, 30% is exceeded, the drive slip $\gamma_A$ being given by the relation:

$$\gamma_A = (V_R - V_F)/V_R,$$

in which $V_R$ denotes the wheel circumferential speed of the vehicle wheel under consideration and $V_F$ the vehicle speed as which the average value of the wheel circumferential speeds of the non-driven front wheels can be taken, then the precharging pump 73 and the return-flow pump drives are cut in. Simultaneously with this cutting in, the ASR control valve 71 is moved into its closing position I, as is the inlet valve 38 of the left rear wheel not tending to spin. Brake pressure built up in the main brake line 24 of the rear-axle brake circuit II as a result of the actuation of the return-flow pump 27 is now fed into the wheel brake 17 of the right rear wheel tending to spin which is thereby decelerated again.

Even before the tendency to spin of the rear wheel subjected to the control has disappeared completely, that is to say even before its drive slip has dropped below a lower threshold value, after the falling below of which it can once again be assumed that propulsion can once more be transmitted to the vehicle to the desired extent via the vehicle wheel subjected to the control and that good driving stability is guaranteed at the same time, the inlet valve 39 is changed over into its closing position I, in order for a limited time to maintain the brake pressure fed into the wheel brake 17 at the value reached until then. During this brake-pressure holding phase of the drive-slip control, the return-flow pump 27 and its precharging pump 73 remain actuated. When the tendency of the right rear wheel to spin increases again during the pressure holding phase, the inlet valve 39 of its wheel brake 17 is once more switched back into the throughflow position 0, namely the brake-pressure built-up position, and the brake pressure in the wheel brake 17 is thereby increased further.

When the tendency to spin of the vehicle wheel subjected to the control accordingly diminishes further, if appropriate after a further brake-pressure holding phase has been executed, the electronic control unit 43 recognizing this from the fact that the drive slip of the vehicle wheel under consideration falls below a lower limit value $\gamma_{min}$, then the brake pressure in the wheel brake 17 is reduced by changing the outlet valve 48 over into its throughflow position I, while the inlet valve 39 continues to remain in its closing position. It is the case that, in this pressure-reduction phase of the drive-slip control, the function of the buffer accumulator 53 and of the return-flow pump 27 is entirely similar to that in the corresponding anti-lock control mode. If the drive slip of the vehicle wheel under consideration thereafter, from the moment when it falls below the said lower limit value, remains below this for a minimum time, then the outlet valve 48 is first switched back into its basic closing position 0, corresponding to the moment when the situation requiring control can be considered as ended.

Now beyond this moment for a time sufficient completely to empty the buffer accumulator 53 which can still be partially charged, however the return-flow pump 27 remains activated, the ASR control valve 71 remains in its closing position I and the inlet valves 38 and 39 of the two rear-wheel brakes 16 and 17 are maintained in their closing position I, until it is certain that the buffer accumulator 53 has become pressureless. Thereafter, the return-flow pump 27 is also cut out, and the inlet valves 38 and 39 and the ASR control valve 71 are switched back into their basic positions 0 again, after which the, as it were, control-neutral operating state of the brake system 10 and of its control devices 11 and 12 as a whole is resumed.

The control signals necessary for the appropriate control actuation of the inlet valves 36 to 39, of the outlet valves 44 and 45 to 48 of the return-flow pump drive, of the precharging pump 73 and of the ASR control valve 71 for the anti-lock or the drive-slip control mode are obtained from the electronic control unit 43, provided jointly for the two control modes, as a result of a processing taking place according to known criteria of output signals from wheel-speed sensors 82 to 85 which are each assigned individually to the non-driven and the driven vehicle wheels. The sensors 82 to 85 generate output signals which are characteristic in terms of level and/or frequency of the wheel circumferential speeds of the individual vehicle wheels and the time changes of which also contain information on the acceleration and deceleration behavior of the individual vehicle wheels.

The minimum time $\Delta t_r$, for which the return-flow pump 27 remains actuated beyond the termination of the situation requiring control and the ASR control valve 71 and inlet valves 38 and 39 of the brake circuit II of the driven vehicle wheels are maintained in their closing positions I, can be determined by a timer provided within the electronic control unit 43.

The end of a situation requiring AS control is recognized by the electronic control unit 43 from the fact that a last signal indicating that on one of the driven vehicle wheels there is still a drive slip greater than the acceptable minimum value $\gamma_{min}$ falls away. According to the conventional logic for drive-slip controls operating by brake engagement, such a situation is necessarily preceded by a brake-pressure reduction phase on the wheel brake of the driven vehicle wheel last subjected to control. This, in turn, means that the inlet valves 38 and 39 of the two wheel brakes 16 and 17 of the driven vehicle wheels are in their closing positions and that the outlet valve of the wheel brake not subjected to the control at the end of this situation is in its basic closing position 0, while the outlet valve of the wheel brake of the vehicle wheel now still subjected to the control assumes it energized open position I.

At the end of the situation requiring control, the outlet valve, e.g., the outlet valve 48, in which a drive-slip control was necessary on the right rear wheel of the vehicle, was in its energized position I, i.e. its through-flow position, and, with the falling away of the signal indicating that the brake slip on the right rear wheel was greater than the minimum value $\gamma_{min}$, is switched back into its basic closing position 0. From this moment on, when the two inlet valves 38 and 39 assigned to the wheel brakes 16 and 17 of the brake circuit II of the driven vehicle wheels are in their closing or energized positions I, there now commences a delay time $\Delta t_r$, which in the simplest instance is determined by the timer of the electronic control unit 43. For the duration of that time $\Delta t_r$, the two inlet valves 38 and 39 of the brake circuit II of the driven vehicle wheels are maintained in their closing positions I, the return-flow pump 27 of this brake circuit II remains actuated, with the precharging pump 73 cut out, and also the ASR control valve 71 is maintained in its energized or closing position I.

Thus, during the delay time $\Delta t_r$, the buffer accumulator 53 of the brake circuit II Of the driven vehicle wheels is pumped empty and the brake fluid received by the buffer accumulator 53 in the last pressure reduction phase of the drive-slip control is conveyed back, via the pressure relief valve 81, into the outlet-pressure space 21 of the brake unit assigned to the brake circuit II of the driven vehicle wheels and, via this outlet-pressure space 21, into the brake-fluid reservoir 74 of the brake system.

The delay time $\Delta t_r$, is so selected that the buffer accumulator 53 can effectively be pumped empty within that time, that is to say, on the assumption that the buffer accumulator 53 is configured as a piston/spring accumulator, the piston of this buffer accumulator 53 reaches its basic position associated with the minimum volume of the storage chamber.

This pumping empty of the buffer accumulator 53 assigned to the brake circuit II of the driven vehicle wheels, following an AS control cycle, takes place in the way described even when a drive-slip control operation is, as it were interrupted by an actuation of the brake system 10. Furthermore, it guarantees that the buffer accumulator 53 is receptive, that is to say brake pressure can be reduced quickly to a sufficient extent if this braking leads immediately to a response of the ABS.

After the expiration of the delay time $\Delta t_r$, which, if it has a fixed preset time has a typical value of 400 ms, the inlet valves 38 and 39 are switched back into their basic positions again, the return-flow pump 27 is cut out and the ASR control valve 71 is likewise switched back into its basic position 0, namely its through flow position, after which the brake system 10 is in all events prepared again for a subsequent braking mode or a drive-slip control mode.

In the illustrated embodiment of FIG. 1, a pressure monitor 86 monitors the pressure in the buffer accumulator 53 and generates an output signal characteristic of the discharged state of the buffer accumulator 53. This output signal is used to trigger the cut out of the return-flow pump 27 and the switching of the ASR control valve 71 and of the inlet valve 38 and 39 back into their basic positions. This output signal is fed as an input to the electronic control unit 43 which processes this signal with the effect of a shortening of the delay time $\Delta t_r$, appropriate to the particular need.

Assuming that the buffer 53 is a piston/spring accumulator, an alternative is to use, instead of the pressure switch 86, a limit switch 87 which generates the signal triggering the ending of the delay time $\Delta t_r$, when the piston (not shown) of the buffer accumulator 53 assumes its basic position corresponding to a minimum volume of the storage chamber.

The outlet line 88 starts from the precharging pump 73 and at the branch point 89 branches off, on the one hand, via the non-return valve 79 to the main brake line 24 of the brake circuit II of the driven vehicle wheels and, on the other hand, via the inlet non-return valve 77 of the return-flow pump 27 of this brake circuit II to its inlet 58. The line 88 can be shut off and opened by a 2/2-way solenoid valve 91 under the control of output signals from the electronic control unit 43. Thus, this 2/2-way solenoid valve 91 can be used by pulsed actuation for proportioning the pressure-medium stream feedable to the return-flow pump 27 and therefore indirectly also for proportioning the brake pressure which, in the drive-slip control mode, can be fed into the wheel brake or wheel brakes 16 and/or 17 of the brake circuit II of the driven vehicle wheels.

This 2/2-way solenoid valve 91 can also be used as a charge control valve for charging a small pressure accumulator 92 which is connected to the outlet line 88 of the return-flow pump 27 between an outlet non-return valve 93 of the precharging pump 73 and the 2/2-way solenoid valve 91. The storage volume of this pressure accumulator 92 corresponds to the maximum absorption volume of the brake circuit II of about 5 cm³, the pressure level up to which the small pressure accumulator 92 can be charged corresponding to the maximum outlet-pressure level of the precharging pump 73.

To control the charging of the small pressure accumulator 92, a pressure switch 94 generates an output signal causing the actuation of the precharging pump 73 when the accumulator pressure has fallen below a threshold value of, for example, 70% of the maximum pressure. Assuming that the pressure accumulator 92 is a piston/spring accumulator, it is also possible to use for the charging-mode control, as an alternative to the pressure switch 94, a limit switch 96 which emits a charge control signal from a specific position of the accumulator piston. It is expedient at the same time if, as illustrated, the basic position of the 2/2-way solenoid valve 91, by way of which the outlet line 88 of the precharging pump 73 can be shut off, is its closing position, so that the accumulator charging mode of the precharging pump 73 is possible as a result of the actuation of the latter alone.

For the embodiment shown in FIG. 1, and the ASR 12 explained by way thereof, it has been assumed that the return-flow pump 27 of the brake circuit II of the driven vehicle wheels is a non-self-priming pump, for example a free-piston pump, as is conventionally provided in the standard ABS 11. In contrast thereto, in the embodiment according to FIG. 2, where like parts are designated with the same numerals used in FIG. 1, the return-flow pump 27' of the brake circuit II of the driven vehicle wheels is a self-priming pump whose inlet 58 if directly connected, via the upstream inlet non-return valve 77, to a brake-fluid feed line 97 from the brake-fluid reservoir 74 of the brake unit 18. The valve spring of the inlet non-return valve 77 of the self-priming return-flow pump 27' is configured for a low restoring force which is equivalent to a pressure of only approximately 0.1 bar. Inserted between the outlet non-return valve 66 of the self-priming return-flow pump 27' and the feed line 97 is a 2/2-way solenoid valve 98 which is arranged directly spatially proximate to the inlet non-return valve 77 of the return-flow pump 27'. The basic position 0 of this 2/2-way solenoid valve 98 is its throughflow position, in which the return-flow pump 27' conveys brake fluid in a circulation mode from its outlet 63 to its inlet 58.

In the event of an actuation of the ASR 12, this 2/2-way solenoid valve 98 is appropriately changed over together with the ASR control valve 71, and for the same duration as this, into its energized position I, namely its closing position. If the anti-lock control responds, the 2/2-way solenoid valve 98 is switched into its closing position I only for the duration of pressure-reduction phases of the anti-lock control, i.e. when the return-flow pump 27' has to convey brake fluid back to the brake unit 18, and is maintained during the remaining course of the anti-lock control in its illustrated throughflow position 0 in which the return-flow pump 27' operates in the circulation mode. It is assumed that the flow resistance of the long feed line 97 is markedly higher than the flow resistance caused by the inlet non-return valve 77 of the return-flow pump 27'.

Figure 2:
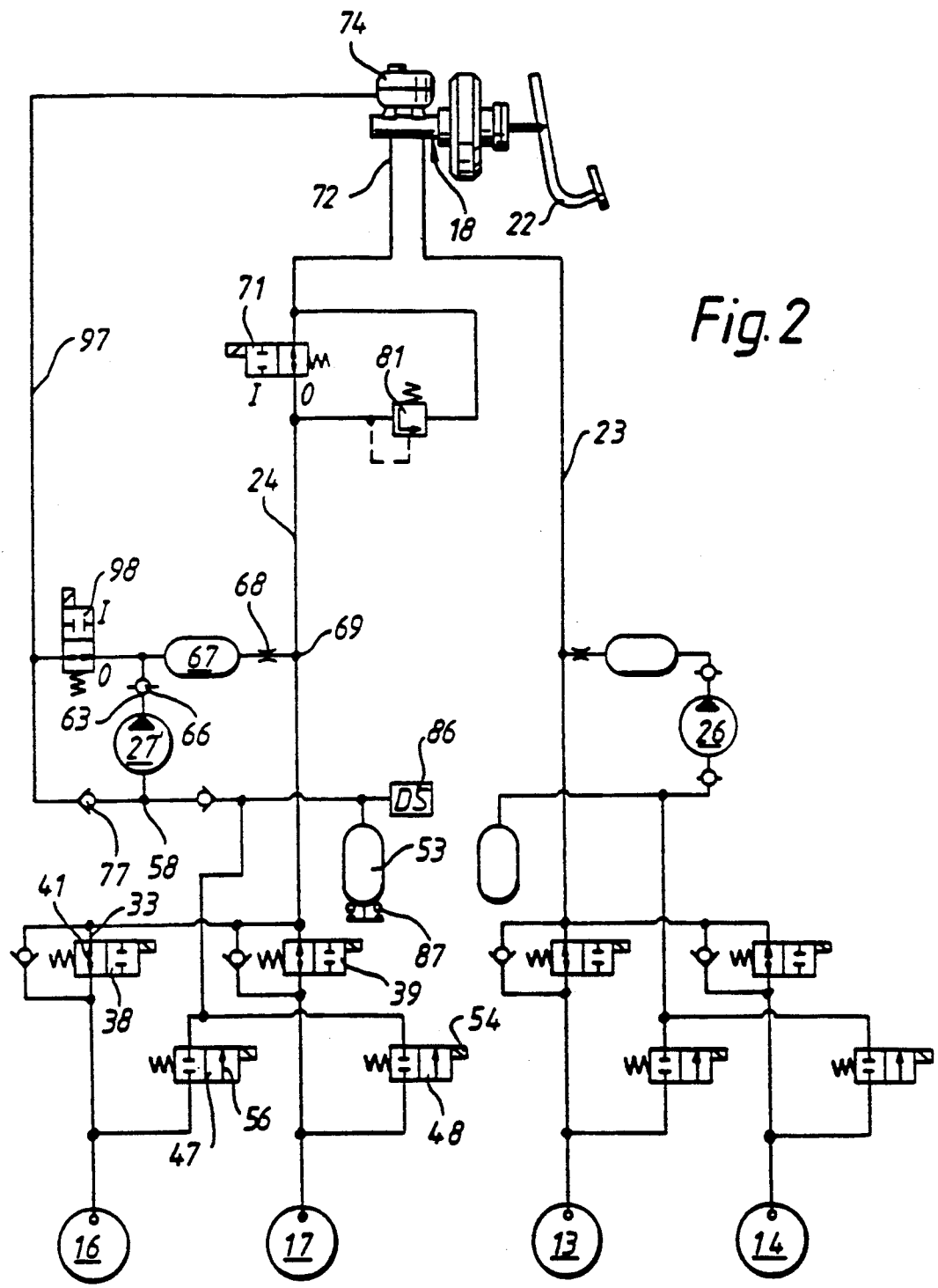
FIG. 2 is a detailed schematic of an ASR corresponding in functional terms to the control device according to FIG. 1 and having a self-priming return-flow pump.
Figure 3:
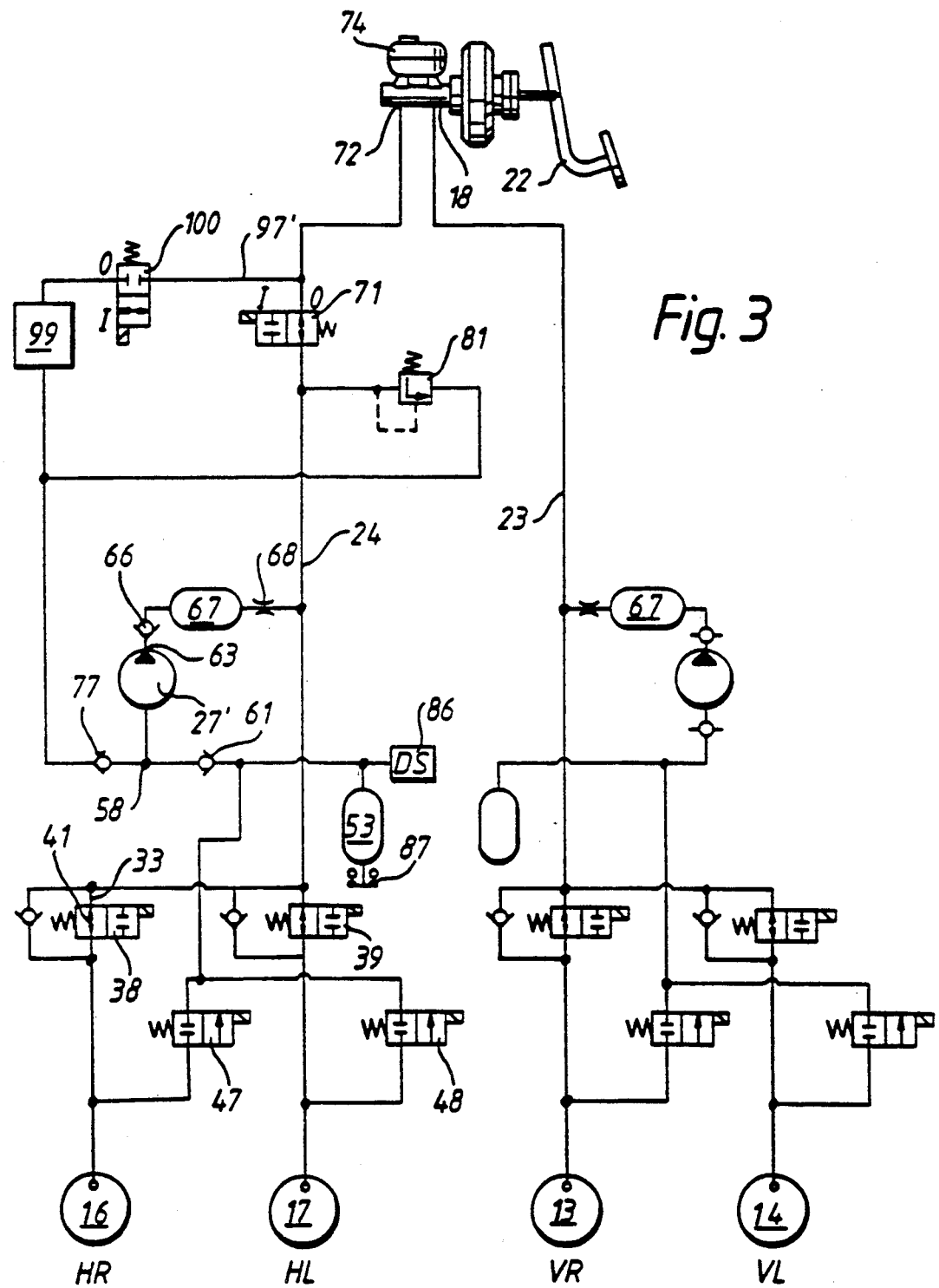
FIG. 3 is a detailed schematic of another embodiment of an ASR of the type shown in FIG. 2 and also with a self-priming return-flow pump.

FIG. 3 shows another embodiment where parts similar to parts in the embodiments of FIGS. 1 and 2 are described by the same reference numerals and are, therefore, not described in further detail. The return-flow pump 27' in FIG. 3 is also a self-priming pump in which an inlet non-return valve 77 corresponds to that of FIG. 2. A brake-fluid feed line 97' leads, via a buffer chamber 99 whose volume corresponds to that of the maximum quantity of brake fluid displaceable into the wheel brakes 16 and 17 of the brake circuit II of the driven vehicle wheels, to the inlet non-return valve 77 of the return-flow pump 27'. The line 97' starts directly from the outlet 72 of the outlet-pressure space of the brake unit 18 which is assigned to the brake circuit II of the driven vehicle wheels and which, as long as the brake unit 18 is not actuated, communicates with the brake-fluid reservoir 74 of the brake unit 18. Once again, a 2/2-way solenoid valve 100 is provided as a mode control valve for operating the return-flow pump 27' and has alternative functional positions 0 and I so that the buffer chamber 99 is shut off from the outlet 72 of the brake unit 18 or is connected thereto. The basic position 0 of the mode control valve 100 is its closing position, in which it is maintained both in the normal braking mode and in a braking mode subjected to the anti-lock control.

The energized position I, namely the throughflow position, of the mode control valve 100 is assigned to the AS mode. The mode control valve 100 is maintained in the energized position I together with the ASR control valve 71 for the same duration.

A pressure relief valve 81 limits pressure in the main brake line 24 of the brake circuit II of the driven vehicle wheels in the AS mode and is so inserted into the hydraulic circuit that, given an excessively high pressure in the main brake line 24, brake fluid overflows therefrom into the buffer chamber 99.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A drive-slip control device and anti-lock system in a road vehicle, comprising a hydraulic multi-circuit brake system, in which wheel brakes of driven vehicle wheels are combined in a static brake circuit which is connected to an outlet-pressure space of a brake unit and in which anti-lock control is operative on the return-flow principle and drive-slip control is operative on the principle of decelerating again a driven vehicle wheel tending to spin by actuating an associated wheel brake, brake-pressure regulating valves assigned individually to the wheel brakes of the driven vehicle wheels and utilized in both the anti-lock mode and the drive-slip control mode for controlling brake-pressure build-up, holding and reduction phases, in the course of which the wheel brakes are at least individually connected to a main brake line of the brake system, being one of shut off therefrom and connected to a system return line, a buffer accumulator operatively connected therein, a high-pressure return flow pump operatively connected on an inlet side thereof to the system return line and the buffer accumulator and to a brake-fluid reservoir of the brake system, and on an outlet side thereof to the main brake line of the brake circuit of the driven vehicle wheels and which, in this course of control phases of the anti-lock control, conveys a quantity of brake fluid corresponding to a quantity of brake fluid bled in pressure-reduction phases of the anti-lock control into the return line and the buffer accumulator from a wheel brake subjected to the control, back into an outlet-pressure space of the brake unit and is utilized for the drive-slip control as an auxiliary pressure source which conveys brake fluid from at least one of the brake-fluid reservoir of the brake system and the return line and from the buffer accumulator into the main brake line of the brake circuit of the driven vehicle wheels, a drive-slip control solenoid valve which, for the drive-slip control, can be moved out of a basic position assigned to a normal braking mode and to a braking mode subjected to an anti-lock control and in which the outlet-pressure space of the brake unit assigned to the brake circuit of the driven vehicle wheels is connected to the main brake line of the brake system, into a functional position in which the main brake line and the outlet of the return-flow pump are shut off from the outlet-pressure space of the brake unit, a pressure relief valve connected in parallel with the drive-slip control valve and via which, even when the drive-slip control valve is in the closing position, brake fluid can be conveyed back towards the brake unit by the return-flow pump and an electronic control unit for generating control signals necessary for actuating the brake-pressure regulating valves, the return-flow pump and the drive-slip control valve in one of the anti-lock mode and drive-slip control mode, as a result of a processing of output signals from wheel-speed sensors assigned to the vehicle wheels and emitting electrical output signals which in terms of at least one of level and frequency contain the information on the dynamic behavior of the vehicle wheels, wherein, after termination of a situation requiring the drive-slip control and in the event of an interruption of a drive-slip control cycle as a result of the actuation of the brake system, the electronic control unit generates control signals, by way of which for a delay time, the return-flow pump continues to operate and the drive-slip control valve is maintained in a closing position assigned to the drive-slip control mode, the duration of this delay time being sufficient to ensure that a quantity of brake fluid corresponding to a quantity previously received by the buffer accumulator of the brake circuit of the driven vehicle wheels is conveyed out of the brake circuit back into the outlet-pressure space of the brake unit assigned thereto.

2. The device and system according to claim 1, wherein the electronic control unit is configured with a time-delay stage which, as a result of the falling away of a signal characteristic of the existence of a situation requiring the drive-slip control, can be actuated for duration of the delay time so as to emit signals causing the actuation of the return-flow pump to be maintained and the actuation of the drive-slip control valve.

3. The device and system according to claim 1, wherein the buffer accumulator comprises a pressure monitor for generating an output signal characteristic of the relieved state thereof and, with the commencement of which, for controlling the ending of the delay time and cut-out of the return-flow pump and change-over of the drive slip control valve to a basic position thereof.

4. The device and system according to claim 3, wherein the electronic control unit is configured with a time-delay stage which, as a result of the falling away of a signal characteristic of the existence of a situation requiring the drive-slip control, can be actuated for duration of the delay time so as to emit signals causing the actuation of the return-flow pump to be maintained and the actuation of the drive-slip control valve.

5. The device and system according to claim 3, wherein the buffer accumulator is a piston/spring accumulator, and the pressure monitor includes as a single transmitter a limit switch to generate an output signal characteristic of the position of an accumulator piston corresponding to a minimum volume of an accumulator storage chamber.

6. The device and system according to claim 5, wherein the electronic control unit is configured with a time-delay stage which, as a result of the falling away of a signal characteristic of the existence of a situation requiring the drive-slip control, can be actuated for duration of the delay time so as to emit signals causing the actuation of the return-flow pump to be maintained and the actuation of the drive-slip control valve.

7. The device and system according to claim 1, wherein a proportioning valve is actuatable by output signals from the electronic control unit and is operatively arranged between a precharging pump causing a supply to the inlet of the return-flow pump from the brake-fluid reservoir of the brake system in the drive-slip control mode, and the inlet side of the return-flow pump.

8. The device and system according to claim 7, wherein the proportioning valve is a 2/2-way solenoid valve whose basic position is its closing position and whose energized position is its throughflow position.

9. The device and system according to claim 7, wherein a low-pressure accumulator is operatively connected to a portion of the feed line leading further to the return-flow pump which leads from an outlet of the precharging pump to the proportioning valve, the storage capacity of the low-pressure accumulator being at least approximately equal to a maximum absorption volume of the brakes of the driven vehicle wheels.

10. The device and system according to claim 9, wherein the proportioning valve is a 2/2-way solenoid valve whose basic position is its closing position and whose energized position is its throughflow position.

11. The device and system according to claim 9, wherein the low-pressure accumulator is configured for a maximum accumulator pressure of 15 bars.

12. The device and system according to claim 11, wherein the maximum accumulator pressure is about 10 bars.

13. The device and system according to claim 11, wherein the low-pressure accumulator includes one of a pressure monitor and a limit switch for controlling the accumulator charging mode of the precharging pump.

14. The device and system according to claim 1, wherein the return-flow pump of the brake circuit of the driven vehicle wheels is a self-priming pump.

15. The device and system according to claim 14, wherein a 2/2-way solenoid inflow control valve is operatively arranged between the delivery outlet of the brake unit assigned to the brake circuit of the driven vehicle wheels and the inlet side of the return-flow pump.

16. The device and system according to claim 15, wherein a functional position of the inflow control valve assigned to the anti-lock control mode is a basic, closing position thereof in which a delivery outlet of the brake unit assigned to the brake circuit of the driven vehicle wheels is shut off from the inlet side of the return-flow pump, and an energized, throughflow position thereof is assigned to the drive-slip control mode.

17. The device and system according to claim 15, wherein a buffer chamber is operatively arranged between the inflow control valve and the inlet of the return-flow pump of the brake circuit of the driven vehicle wheels, and the volume of the buffer chamber corresponds at least to the maximum absorption volume of the wheel brakes of the brake circuit of the driven vehicle wheels and is approximately equal to the maximum absorption volume.

18. The device and system according to claim 17, wherein a functional position of the inflow control valve assigned to the anti-lock control mode is a basic, closing position thereof in which a delivery outlet of the brake unit assigned to the brake circuit of the driven vehicle wheels is shut off from the inlet side of the return-flow pump, and an energized, throughflow position thereof is assigned to the drive-slip control mode.

19. The device and system according to claim 17, wherein the pressure relief valve, via which overpressure which can be generated in the drive-slip control mode by the return-flow pump in the main brake line of the brake circuit of the driven vehicle wheels can be relieved towards the brake unit and via thereof to the reservoir, is operatively arranged between the main brake line of the brake circuit of the driven vehicle wheels and a portion of the brake-fluid feed line leading from the buffer chamber to the inlet of the return-flow pump.

20. The device and system according to claim 14, wherein a 2/2-way solenoid valve is operatively arranged between the outlet of the return-flow pump and the brake-fluid feed line leading from the brake-fluid reservoir of the brake unit to the inlet side of the return-flow pump and is actuatable by output signals from the electronic control unit, whereby the valve can be changed over between a throughflow position assigned to the normal braking mode and to brake-pressure holding and brake-pressure rebuild-up phases of the anti-lock control and a closing position assigned to brake-pressure reduction phases of the anti-lock control mode and to the drive-slip control mode.

21. The device and system according to claim 20, wherein an energized position of the 2/2-way solenoid valve is the closing position assigned to the drive-slip control mode and to the brake pressure-reduction mode of the anti-lock control mode.

* * * * *